(12) United States Patent
Shah et al.

(10) Patent No.: US 8,982,755 B1
(45) Date of Patent: Mar. 17, 2015

(54) METHODS AND SYSTEMS FOR SELECTING A TTI BUNDLE SIZE

(71) Applicant: Sprint Spectrum L.P., Overland Park, KS (US)

(72) Inventors: Maulik K. Shah, Overland Park, KS (US); Jason P. Sigg, Overland Park, KS (US); Kurt M. Landuyt, Parkville, MO (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 154 days.

(21) Appl. No.: 13/659,606

(22) Filed: Oct. 24, 2012

(51) Int. Cl.
*G08C 17/00* (2006.01)
*H04L 1/18* (2006.01)

(52) U.S. Cl.
CPC ............................. *H04L 1/18* (2013.01)
USPC ........................................................ 370/311

(58) Field of Classification Search
None
See application file for complete search history.

(56) References Cited

U.S. PATENT DOCUMENTS

| 7,764,965 | B2 * | 7/2010 | Bartlett | 455/436 |
|---|---|---|---|---|
| 2009/0257408 | A1 * | 10/2009 | Zhang et al. | 370/336 |
| 2009/0268707 | A1 | 10/2009 | Pani et al. | |
| 2009/0307554 | A1 | 12/2009 | Marinier et al. | |
| 2010/0042884 | A1 | 2/2010 | Kuo et al. | |
| 2010/0067412 | A1 | 3/2010 | Kitazoe et al. | |
| 2010/0329188 | A1 | 12/2010 | Jen | |
| 2011/0038352 | A1 * | 2/2011 | Bergman et al. | 370/331 |
| 2011/0078530 | A1 | 3/2011 | Shizaki et al. | |
| 2012/0147830 | A1 | 6/2012 | Löhr et al. | |

FOREIGN PATENT DOCUMENTS

EP    2 184 882 A2    5/2010

OTHER PUBLICATIONS

Susitaival et al., "LTE coverage improvement by TTI bundling," Proceedings of 69th Vehicular Technology Conference, IEEE, Barcelona, Spain, 2009.

* cited by examiner

*Primary Examiner* — Ian N Moore
*Assistant Examiner* — Latresa McCallum

(57) ABSTRACT

A radio access network (RAN) determines whether transmission time interval (TTI) bundling is warranted for a wireless communication device (WCD) based on at least a power headroom report from the WCD. In response to determining that TTI bundling is warranted, the RAN selects a TTI bundle size, N, for the WCD and instructs the WCD to use the selected TTI bundle size. The TTI bundle size, N, could be selected from among a set of predefined values, such as N=2, N=3, and N=4. The selection could be based on various factors, such as a utilization of an uplink shared channel, a re-transmission rate of the WCD, and/or a remaining battery life of the WCD.

9 Claims, 9 Drawing Sheets

METHODS AND SYSTEMS FOR SELECTING A TTI BUNDLE SIZE

BACKGROUND

In some wireless communication systems, when data that is transmitted by a transmitting entity to a receiving entity is not received by the receiving entity, or is received by the receiving entity with one or more errors, the data may be re-transmitted. The re-transmission of data could occur either automatically or in response to feedback from the receiving entity. For example, in Long Term Evolution (LTE) air interfaces, a Hybrid Automatic Repeat Request (HARQ) procedure is used. In the HARQ approach, after a transmitting entity has transmitted a block of data, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data. The transmitting entity may also re-transmit the data if the transmitting entity does not receive any HARQ response within a certain period of time.

This re-transmission approach can allow data to be successfully transmitted from a transmitting entity to a receiving entity even when there is a substantial probability that the transmitted data will be received with one or more errors, for example, because of poor radio frequency (RF) conditions. Specifically, the data can be re-transmitted multiple times until the data is received without errors. This re-transmission approach, however, also increases latency. For example, there can be a period of delay between when the transmitting entity transmits data and when the transmitting data receives a NACK response from the receiving entity and another period of delay between when the transmitting entity receives the NACK response and when the transmitting entity begins re-transmitting the data.

In order to reduce the delay associated with re-transmitting data, LTE supports a bundling option for data transmissions by the user equipment (UE) in the Physical Uplink Shared Channel (PUSCH). Normally, the UE transmits data in one transmission time interval (TTI), which corresponds to a 1 millisecond (ms) subframe, and then waits to receive a HARQ response before re-transmitting the data or transmitting additional data. However, when TTI bundling is used, the UE transmits the same data four times in four consecutive TTIs and then waits to receive a HARQ response. In this way, the UE can transmit four instances of the same data, which allows for more robust reception of the data, but without the delay that would be associated with the UE transmitting the data four times and waiting for a HARQ response after each transmission.

OVERVIEW

In a first principal aspect, an exemplary embodiment provides a method that involves a radio access network (RAN) and a wireless communication device (WCD). The RAN receives a power headroom report from the WCD, and the RAN determines that transmission time interval (TTI) bundling is warranted for the WCD based on at least the power headroom report. In response to determining that TTI bundling is warranted for the WCD, the RAN selects a TTI bundle size, N, for the WCD from among at least three values, the at least three values including N=2, N=3, and N=4. The RAN instructs the WCD to use the selected TTI bundle size.

In a second principal aspect, an exemplary embodiment provides a method that involves a radio access network (RAN) and a wireless communication device (WCD). The RAN receives a power headroom report from the WCD, and the RAN determines that transmission time interval (TTI) bundling is warranted for the WCD based on at least the power headroom report. In response to determining that TTI bundling is warranted for the WCD, the RAN selects a TTI bundle size, N, for the WCD based on at least one of a utilization of an uplink shared channel, a re-transmission rate of the WCD, or a remaining battery life of the WCD. The RAN instructs the WCD to use the selected TTI bundle size.

In a third principal aspect, an exemplary embodiment provides a system. The system comprises: a transmitter for transmitting orthogonal frequency division multiplexing (OFDM) signals in a plurality of downlink channels, the plurality of downlink channels including a downlink shared channel and a downlink control channel; a receiver for receiving OFDM signals in a plurality of uplink channels, the plurality of uplink channels including an uplink shared channel; and a controller. The controller is configured to: determine whether transmission time interval (TTI) bundling is warranted for a wireless communication device (WCD) based on at least a power headroom report transmitted by the WCD; in response to a determination that TTI bundling is warranted for the WCD, select a TTI bundle size, N, for the WCD from among at least three values, the at least three values including N=2, N=3, and N=4; and cause the transmitter to transmit an instruction to the WCD in the downlink control channel, wherein the instruction instructs the WCD to use the selected TTI bundle size when transmitting data in the uplink shared channel.

DETAILED DESCRIPTION OF EXAMPLE EMBODIMENTS

1. Introduction

Figure 1:
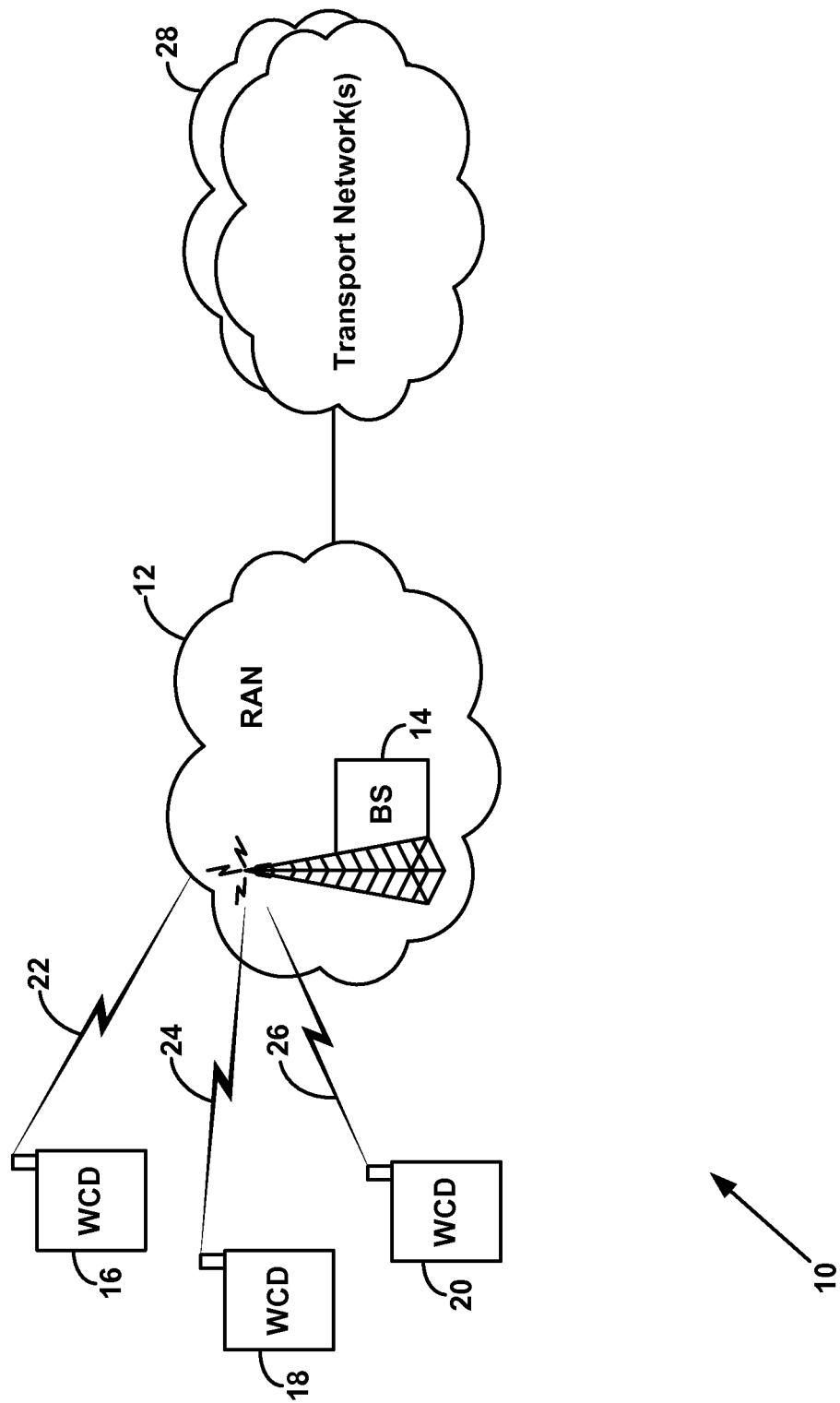
FIG. 1 is a block diagram of a communication system, in accordance with an example embodiment.

The inventors have recognized that conventional TTI bundling can be undesirably limiting. For example, while TTI bundling can improve the chances of a UE's data being successfully received, it also increases the utilization of the uplink shared channel (PUSCH channel). If the utilization of the uplink shared channel becomes sufficiently high, for example, because of TTI bundling being used by multiple UEs, then the transmission of data by some UEs could be delayed due to uplink resource limitations. This, in turn, could negate some of the latency-reducing benefits that TTI bundling was intended to provide. In addition, TTI bundling can cause a UE's battery to become depleted more quickly.

To address such limitations, the inventors propose a more flexible approach for TTI bundling. In one aspect, greater flexibility can be provided by having the RAN select a TTI bundle size from among multiple values, instead of being limited to a fixed TTI bundle size of four. In one example, the TTI bundle size, N, could be selected from among at least three values, such as N=2, N=3, and N=4. In other examples, other TTI bundle sizes could be used and/or the RAN may select the TTI bundle size from among a greater or fewer number of values.

In another aspect, greater flexibility could be provided by having the RAN select the TTI bundle size for a wireless communication device (WCD) based on information regarding the WCD, information regarding the uplink shared channel being used by the WCD, and/or other information. In one example, the RAN may select a TTI bundle size for the WCD based on a utilization of the uplink shared channel. As noted above, TTI bundling can be counterproductive if the uplink shared channel is already heavily used. Thus, if the utilization is in a low range, the RAN may select a relatively large TTI bundle size, such as N=4. If the utilization is in a high range, the RAN may select a relatively small TTI bundle size, such as N=2. If the utilization is in a medium range, the RAN may select an intermediate TTI bundle size, such as N=3. In this way, the RAN may beneficially select TTI bundle sizes that are adapted to the current utilization of the uplink shared channel.

In another example, the RAN may select a TTI bundle size for a WCD based on the WCD's re-transmission rate. This approach can be useful because a high re-transmission rate may indicate a greater need for TTI bundling than a low re-transmission rate. Thus, if the re-transmission rate is in a high range, the RAN may select a relatively high TTI bundle size, such as N=4. If the re-transmission rate is in a low range, the RAN may select a relatively small TTI bundle size, such as N=2. If the re-transmission rate is in a medium range, the RAN may select an intermediate TTI bundle size, such as N=3. In this way, the RAN may beneficially select a TTI bundle size for a WCD that is adapted to the WCD's particular need for TTI bundling, as indicated by its re-transmission rate.

In yet another example, the RAN may select a TTI bundle size for a WCD based on the WCD's remaining battery life. This approach can be useful because TTI bundling can cause the WCD's battery to become depleted more quickly. Thus, if the remaining battery life is in a high range, the RAN may select a relatively high TTI bundle size, such as N=4. If the remaining battery life is in a low range, the RAN may select a relatively small TTI bundle size, such as N=2. If the remaining battery life is in a medium range, the RAN may select an intermediate TTI bundle size, such as N=3. In this way, the RAN may beneficially select a TTI bundle size for a WCD that is adapted to the WCD's remaining battery life.

It is to be understood that the foregoing descriptions of the RAN selecting a TTI bundle size for a WCD based on the utilization of the uplink shared channel, the WCD's re-transmission rate, or the WCD's remaining battery life are merely illustrative examples. The RAN could select TTI bundle sizes based on other considerations. In addition, the RAN may take into account multiple types of information when selecting a TTI bundle size for a WCD. As one example, if the WCD's re-transmission rate is high and/or the WCD's remaining battery life is high, suggesting that the WCD could use a relatively large TTI bundle size (such as N=4), the RAN may nonetheless select a relatively small TTI bundle size (such as N=2) or intermediate TTI bundle size (such as N=3) if the utilization of the uplink shared channel is high. As another example, if the utilization of the uplink shared channel is low and/or the WCD's re-transmission rate is high, suggesting that the WCD could use a relatively large TTI bundle size (such as N=4), the RAN may nonetheless select a relatively small TTI bundle size (such as N=2) or an intermediate TTI bundle size (such as N=3) if the WCD's remaining battery life is low.

Before selecting a TTI bundle size for a WCD, the RAN may first determine whether TTI bundling is warranted for that WCD. In an example, the RAN may determine whether TTI bundling is warranted for a WCD based on at least a power headroom report that is received from the WCD. In LTE, a WCD may calculate a "power headroom" as a difference between the WCD's transmit power requirement for its uplink resource allocation and the WCD's maximum transmit power. If the power headroom that a WCD reports is positive, indicating that the WCD's transmit power requirement is less than its maximum transmit power, then the RAN may conclude that TTI bundling is not warranted for the WCD. If the power headroom that the WCD reports is negative, indicating that the WCD's transmit power requirement is more than its maximum transmit power, then the RAN may conclude that TTI bundling might be warranted for the WCD.

In addition to the WCD's power headroom report, the RAN may also consider the service class associated with the data to be transmitted by the WCD. For example, TTI bundling might be supported for only a particular service class (e.g., voice services), or for only a particular set of service classes (e.g., guaranteed bit rate services). To determine the service class associated with the data to be transmitted by the WCD, the RAN may refer to a buffer status report from the WCD. For example, the RAN may determine that TTI bundling is warranted for a WCD only if the WCD's buffer status report indicates that the WCD is buffering for transmission data associated with a service class for which TTI bundling is supported.

In determining whether TTI bundling is warranted for a WCD, the RAN may also consider other information. For example, if the utilization of the uplink shared channel is very high and/or the WCD's remaining battery life is very low, then the RAN may not allow TTI bundling for the WCD, even if other sources of information (such as the WCD's power headroom report and buffer status report) would otherwise indicate that TTI bundling is warranted.

Once the RAN has determined that TTI bundling is warranted for a WCD and has selected a TTI bundle size, the RAN may instruct the WCD to use TTI bundling with the selected TTI bundle size. The instruction may be part of an uplink resource allocation that the RAN transmits to the WCD, for example, in a Physical Downlink Control Channel (PDCCH). Thus, when the RAN allocates uplink resources to the WCD to transmit data in the uplink shared channel (PUSCH), the RAN may also instruct the WCD to use TTI bundling with the selected TTI bundle size for some or all of the WCD's uplink resource allocation and/or for some or all of the WCD's data.

2. Example Communication System

FIG. 1 is a block diagram of a communication system 10 in which exemplary embodiments may be employed. Communication system 10 includes a radio access network (RAN) 12 that includes one or more entities that can communicate over an air interface, as exemplified by base station (BS) 14. RAN 12 could also include one or more control entities, such as a base station controller (BSC) or radio network controller (RNC). BS 14 could be, for example, a base transceiver station, a wireless access point, an access node, a Node-B, or an eNodeB. Although FIG. 1 shows only one base station in RAN 12, it is to be understood that RAN 12 could include any number of base stations.

BS 14 radiates to define one or more wireless coverage areas within which BS 14 can wirelessly communicate with WCDs. The wireless coverage area defined by BS 14 could be a cell that generally surrounds BS 14. Alternatively, BS 14 may define multiple wireless coverage areas, such as sectors. Each sector may be defined by multiple antennas in BS 14 so as to generally correspond to a range of azimuthal angles (e.g., 120°) about BS 14.

For purposes of illustration, BS 14 is shown as being in wireless communication with WCDs 16, 18, and 20 via respective air interfaces 22, 24, and 26. WCDs 16, 18, and 20 could be wireless telephones, wireless handheld or laptop computers, or other types of wireless communication devices. In some cases, a WCD could be referred to as a UE. Although FIG. 1 shows BS 14 in wireless communication with three WCDs, it is to be understood that BS 14 could be in wireless communication with a greater or fewer number of WCDs. In addition, the number of WCDs in wireless communication with BS 14 can change over time, for example, as a result of one or more WCDs moving into or out of the wireless coverage area of BS 14 and/or as a result of one or more WCDs beginning or ending communication sessions.

Each of air interfaces 22, 24, and 26 could include a respective uplink, with which a WCD can transmit data to BS 14, and a respective downlink, with which BS 14 can transmit data to a WCD. The communications over air interfaces 22, 24, and 26 could conform to any wireless protocol now known or later developed. For purposes of illustration, the communications over air interfaces 22, 24, and 26 will be described herein with respect to the LTE protocol.

RAN 12 may provide access to one or more transport networks 28, which could include, for example, the public switched telephone network (PSTN) and/or the Internet or other packet-switched networks. With this arrangement, a WCD being served by BS 14 may engage in a communication session, via RAN 12, with an endpoint connected to one of transport networks 28. The endpoint could be, for example, another WCD, a landline telephone, an email server, Web server, media server, or gaming server. The communication session could involve voice, text, images, video, data, or other media that is transferred from the WCD to the endpoint and/or from the endpoint to the WCD.

Thus, when a WCD, such as WCD 16, 18, or 20, is involved in a communication session, the WCD may transmit data over an uplink channel to BS 14 and may receive data from BS 14 over a downlink channel. In some cases, the communication session could be one that involves a user of the WCD, such as a voice communication application or Web browsing application. In other cases, the communication session could involve a background task, such as periodically registering with wireless network 12. In some implementations, WCDs 16, 18, and 20 may transmit data to BS 14 over a uplink shared channel. The usage of the uplink shared channel may be controlled by BS 14 or by some other entity in wireless network 12.

Figure 2A:
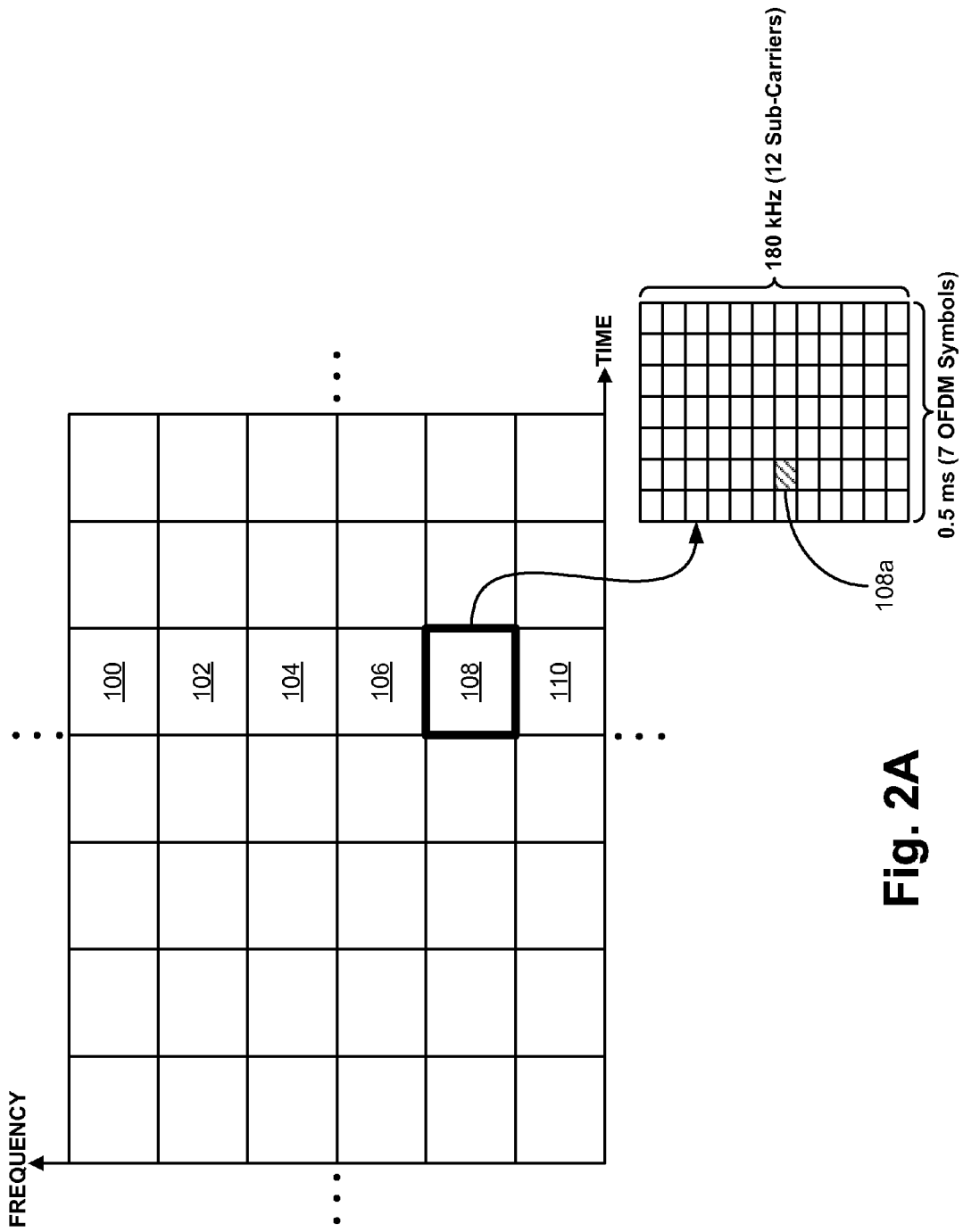
FIG. 2A is a conceptual illustration of a division of uplink resources into resource blocks, in accordance with an example embodiment.

For example, the LTE protocol defines a Physical Uplink Shared Channel (PUSCH) that WCDs can use to transmit data to a base station. Portions of the PUSCH may be allocated to particular WCDs by allocating resource blocks. FIG. 2A illustrates how the uplink resources in a given wireless coverage area may be divided in time and frequency domains into resource blocks. In an LTE air interface, data is transmitted on both the uplink and the downlink in the form of orthogonal frequency division multiplexing (OFDM) symbols. Each OFDM symbol is formed from a plurality of sub-carriers, typically 12 sub-carriers, each with a bandwidth of 15 kHz. Thus, a resource block corresponds to a plurality of sub-carriers that are used to form an OFDM symbol and has a duration that can accommodate a particular number of OFDM symbols.

In the time domain, each resource block typically occupies a 0.5 ms slot of time. By way of example, FIG. 2A shows resource blocks 100-110 for a particular slot. In the frequency domain, each of resource blocks 100-110 occupies a respective portion of frequency bandwidth, typically 180 kHz in LTE implementations. Although FIG. 2A shows six resource blocks in each slot, a wireless coverage area could have a greater number of resource blocks, as indicated by the dots above and below resource blocks 100-110.

FIG. 2A also includes a more detailed view of uplink resource block 108. This detailed view shows that the 180 kHz of frequency bandwidth corresponds to 12 sub-carriers of 15 kHz each. Further, in this example, the 0.5 ms slot of time corresponds to the duration of seven OFDM symbols. In other examples, a 0.5 ms slot could correspond to a different number of OFDM symbols. Thus, a resource block may be described as a set of resource elements, with each resource element corresponding to one modulated sub-carrier in an OFDM symbol. The detailed view of uplink resource block 108 in FIG. 2A shows the division of the resource block into multiple resource elements, such as resource element 108a.

A resource block may be allocated to a particular WCD to transmit data in the uplink shared channel (PUSCH channel). For example, resource blocks 100 and 102 might be allocated to WCD 16, resource blocks 104-108 might be allocated to WCD 18, and resource block 110 might be allocated to WCD 20. The allocation of resource blocks to WCDs could be made by BS 14 or by some other entity in wireless network 12. Further, resource blocks could be allocated to WCDs based on the power headrooms reported by the WCDs. BS 14 may periodically evaluate, and potentially adjust, the allocation of resource blocks to WCDs. This evaluation may occur every subframe, wherein a subframe consists of two consecutive slots (i.e., a subframe is a 1 ms period of time). Thus, when a WCD is allocated one or more resource blocks, that allocation may be maintained throughout a subframe (two consecutive slots). In subsequent subframes, the WCD may be allocated a different number of resource blocks.

Figure 2B:
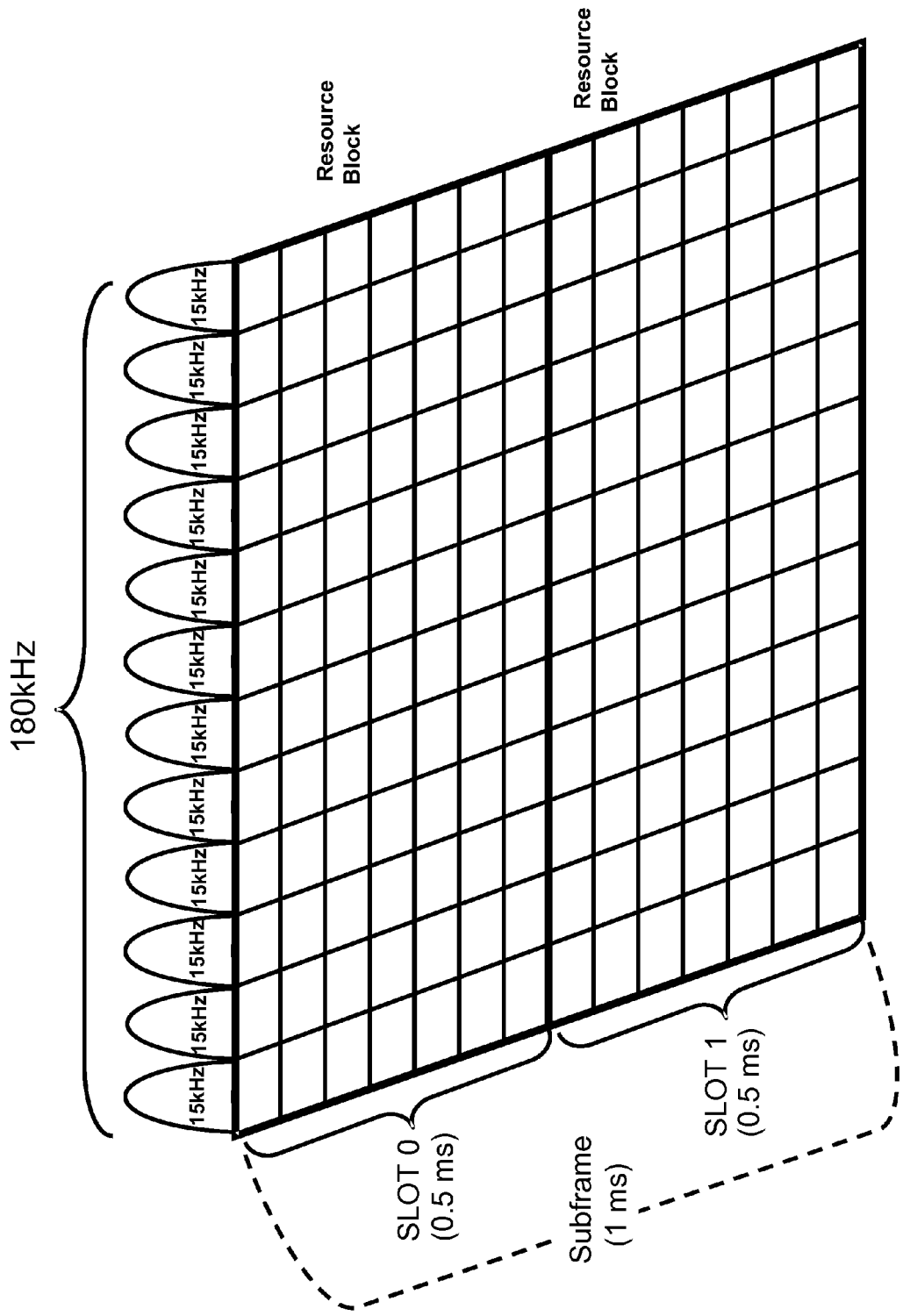
FIG. 2B is a conceptual illustration of two time-consecutive resource blocks, in accordance with an example embodiment.

FIG. 2B illustrates an uplink resource allocation for a WCD that is maintained for two consecutive slots of time (Slot 0 and Slot 1) in a given subframe. These two consecutive slots of time are treated as a transmission time interval (TTI) for purposes of LTE's HARQ process. In particular, after a WCD has transmitted its data in a TTI, such as shown in FIG. 2B, the WCD waits to receive a HARQ response from the RAN to determine whether the data should be re-transmitted or whether the WCD can transmit additional data. If the HARQ response is an ACK, indicating that the data was successfully received, then the WCD can transmit additional data. If the HARQ response is a NACK, indicating that the data was received with one or more errors, then the WCD re-transmits the data. The WCD may also re-transmit the data if the WCD does not receive a HARQ response within a predetermined period of time.

On the other hand, if a WCD has been instructed to use TTI bundling, then the WCD may transmit the same data in multiple, consecutive TTIs before waiting for a HARQ response. The TTI bundle size is the number of consecutive TTIs that the WCD uses. Thus, a TTI bundle size of N means that the WCD transmits the same data N times in N consecutive TTIs (i.e., 2N consecutive slots) before waiting for a HARQ response.

As discussed below, the RAN may determine whether TTI bundling is warranted for a particular WCD. In response to a determination that TTI bundling is warranted, the RAN may select a TTI bundle size, N, where N could be any number greater than or equal to 2, and instruct the particular WCD to use TTI bundling with the selected TTI bundle size.

3. Example Methods

FIGS. 3-7 are flow charts illustrating example methods that may be performed by a RAN and/or by a WCD. For purposes of illustration, the example methods are described with reference to the configuration of communication system 10 shown in FIG. 1 and the type of uplink resource allocations shown in FIGS. 2A and 2B. It is to be understood, however, that differently configured communication systems and/or other types of uplink resource allocations could be used.

Figure 3:
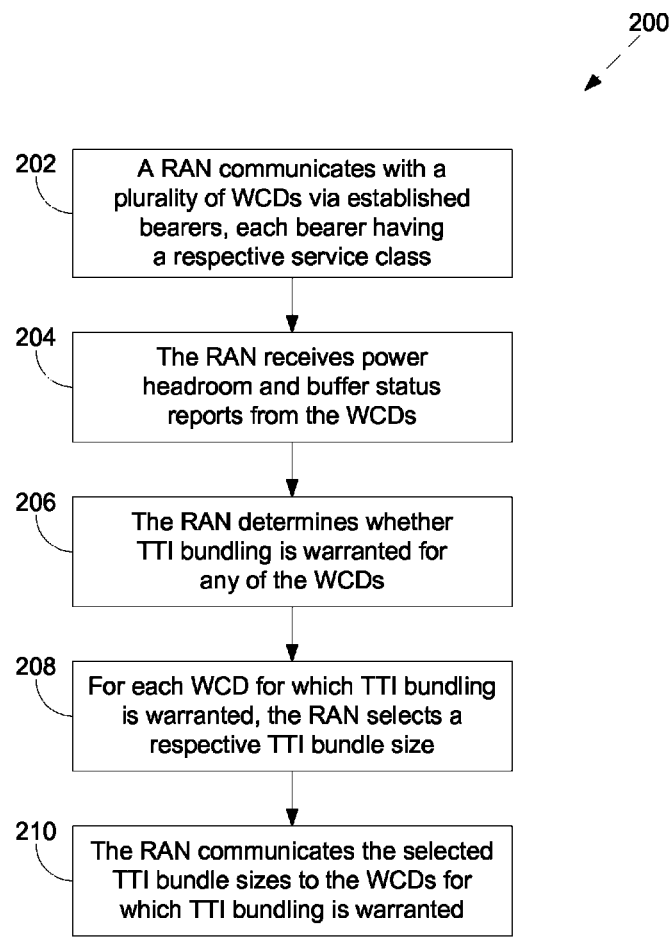
FIG. 3 is a flow chart of a method for a RAN, in accordance with an example embodiment.

FIG. 3 is a flowchart illustrating an example method 200 for a RAN, in which the RAN determines whether TTI bundling is warranted for any of the WCDs being served by the RAN and selects a TTI bundle size for those WCDs for which TTI bundling is warranted. In method 200, the RAN (e.g., RAN 12 shown in FIG. 1) communicates with a plurality of WCDs (e.g., WCDs 16, 18, and 20 shown in FIG. 1) via established bearers, each bearer having a respective service class, as indicated by block 202. With regard to service class, LTE defines several different types of guaranteed bit rate and non-guaranteed bit rate service classes. The guaranteed bit rate service classes include voice, video, and real-time gaming. The non-guaranteed bit rate service classes include IMS signaling, TCP-based communications (such as Web browsing, email, chat, and FTP), as well as non-guaranteed bit rate voice and video services.

The RAN can also receive from the WCDs various types of reports from which the RAN can determine whether TTI bundling is warranted for a particular WCD and/or what TTI bundle size to select. For example, the RAN may receive power headroom and buffer status reports from the WCDs, as indicated by block 204.

A power headroom report from a WCD provides an estimate of the difference between the transmit power requirement for the WCD's uplink resource allocation and the WCD's maximum transmit power. A WCD may report a positive power headroom when the WCD's maximum transmit power is greater than its transmit power requirement, and may report a negative power headroom when the WCD's maximum transmit power is less than its transmit power requirement. A positive headroom report from a WCD may indicate that the WCD's data is likely to be received by the RAN without errors, whereas a negative power headroom report may indicate that there is a substantial likelihood that the WCD's data could be received by the RAN with errors. Thus, a negative power headroom report from a WCD may suggest that TTI bundling is warranted.

A buffer status report from a WCD can provide an indication of the amount of data that the WCD is buffering for transmission in relation to a particular bearer, or in relation to a group of bearers that have the same or similar service class. Thus, if a WCD's buffer status report indicates that the WCD has data to transmit in relation to a bearer that has a service class for which TTI bundling is supported, then the WCD may be candidate for TTI bundling.

In addition to power headroom reports and buffer status reports, the RAN may also receive other types of reports from the WCDs. For example, in some implementations, the RAN may receive battery life reports, where a battery life report from a WCD indicates the WCD's remaining battery life. The RAN may use battery life reports to determine whether TTI bundling is warranted for any WCDs and/or what TTI bundle size to select.

As indicated by block 206, the RAN determines whether TTI bundling is warranted for any of the WCDs. In an example embodiment, the RAN determines whether TTI bundling is warranted for a WCD based on at least the power headroom report from the WCD. For example, the RAN may determine that TTI bundling is warranted for the WCD when the WCD has reported a power headroom that is negative (or below a predefined threshold) and may determine that TTI bundling is not warranted for the WCD when the WCD has reported a power headroom that is positive (or above a predefined threshold).

However, the RAN may consider other information as well. For example, the RAN might support TTI bundling for only a particular service class (e.g., voice) or for only a particular set of service classes (e.g., guaranteed bit rate service classes). To determine whether a WCD has data to transmit in relation to a bearer that has a service class for which TTI bundling is supported, the RAN may consult a buffer status report from the WCD.

In an example embodiment, the RAN may determine that TTI bundling is warranted for a WCD only if (i) the WCD has reported a power headroom that is less than a predefined threshold (e.g., a negative power headroom) and (ii) the WCD has reported that it is buffering for transmission data in relation to a bearer with a service class for which TTI bundling is supported. It is to be understood, however, that conditions (i) and (ii) are merely illustrative examples, as the RAN could apply other criteria when determining whether TTI bundling is warranted for a WCD.

In some embodiments, the RAN may determine that TTI bundling is not warranted for a WCD even if conditions (i) and (ii) are both satisfied. In such embodiments, the RAN may consider other information in addition to the WCD's power headroom and buffer status report. In one example, the RAN may consider the utilization of the uplink shared channel being used by the WCD. If the utilization is sufficiently high, then the RAN may determine that TTI bundling is not warranted for the WCD, regardless of the WCD's power headroom report and buffer status report. In another example, the RAN may consider a WCD's remaining battery life, which may be indicated by a battery life report from the WCD. If the WCD's remaining battery life is sufficiently low (e.g., less than 20%), then the RAN may determine that TTI bundling is not warranted for a WCD, regardless of the WCD's power headroom report and buffer status report. The RAN could also take into consideration other information when determining whether TTI bundling is warranted for a WCD.

For each WCD for which TTI bundling is warranted, the RAN selects a respective bundle size, as indicated by block 208. In some examples, the RAN selects a TTI bundle size, N, from a set of predefined bundle sizes, such as N=2, N=4, and N=4. It is to be understood, however, that the RAN could select from additional and/or other TTI bundle sizes as well.

Figure 5:
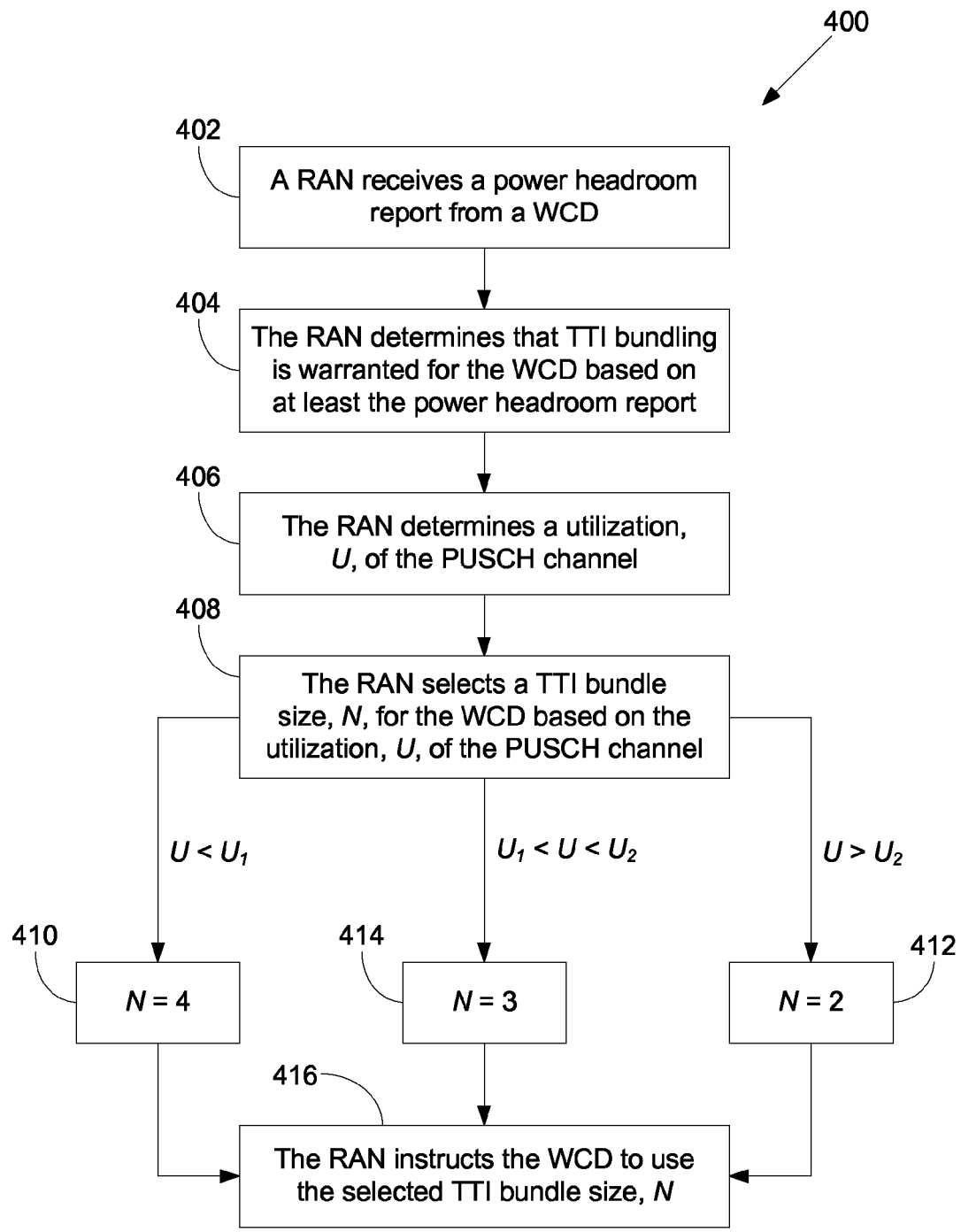
FIG. 5 is a flow chart of a method for a RAN, in which the RAN selects a TTI bundle size for a WCD based on the utilization of an uplink shared channel, in accordance with an example embodiment.
Figure 6:
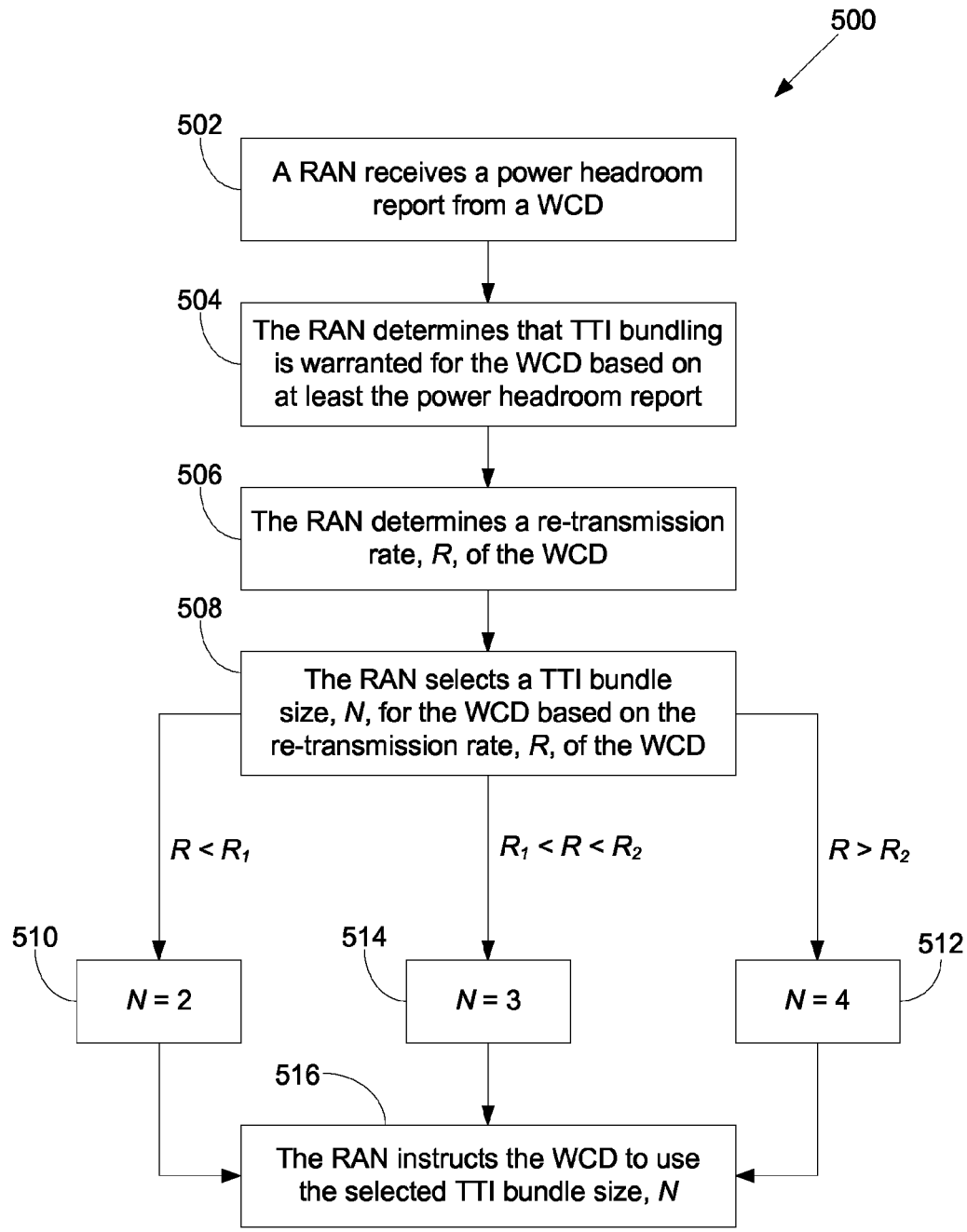
FIG. 6 is a flow chart of a method for a RAN, in which the RAN selects a TTI bundle size for a WCD based on a re-transmission rate of the WCD, in accordance with an example embodiment.
Figure 7:
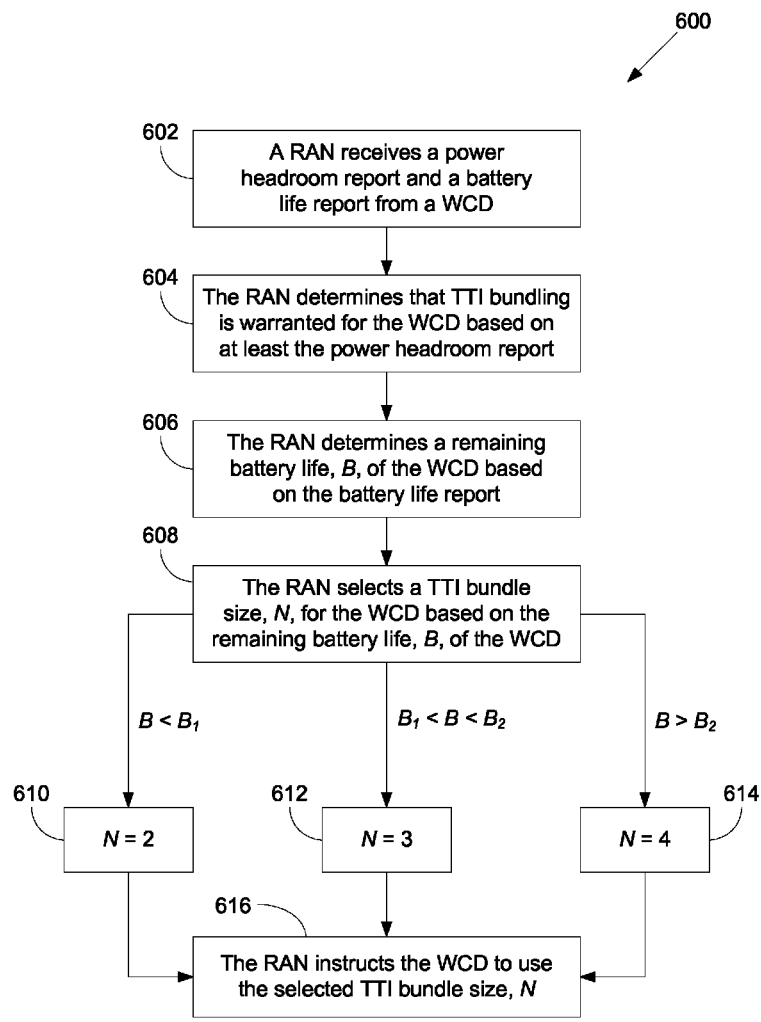
FIG. 7 is a flow chart of a method for a RAN in which the RAN selects a TTI bundle size for a WCD based on a remaining battery life of the WCD, in accordance with an example embodiment.

The RAN may select a TTI bundle size for a WCD based on various types of information. In some examples, the RAN selects a TTI bundle size based on the utilization of the uplink shared channel (PUSCH channel), the WCD's re-transmission rate, and/or the WCD's remaining battery life. FIGS. 5-7, which are described below, illustrate such examples. In addition to these examples, the RAN may select TTI bundle sizes based on other information. For example, a WCD's power headroom report could be a factor in selecting a TTI bundle size.

Once the RAN has selected TTI bundle sizes, the RAN communicates the selected TTI bundle sizes to the WCDs for which TTI bundling is warranted, as indicated by block 210. The RAN may communicate the selected TTI bundling sizes to the WCDs over a downlink control channel, such as a PDCCH channel, for example, in connection with uplink resource allocations that are granted to these WCDs.

Figure 4:
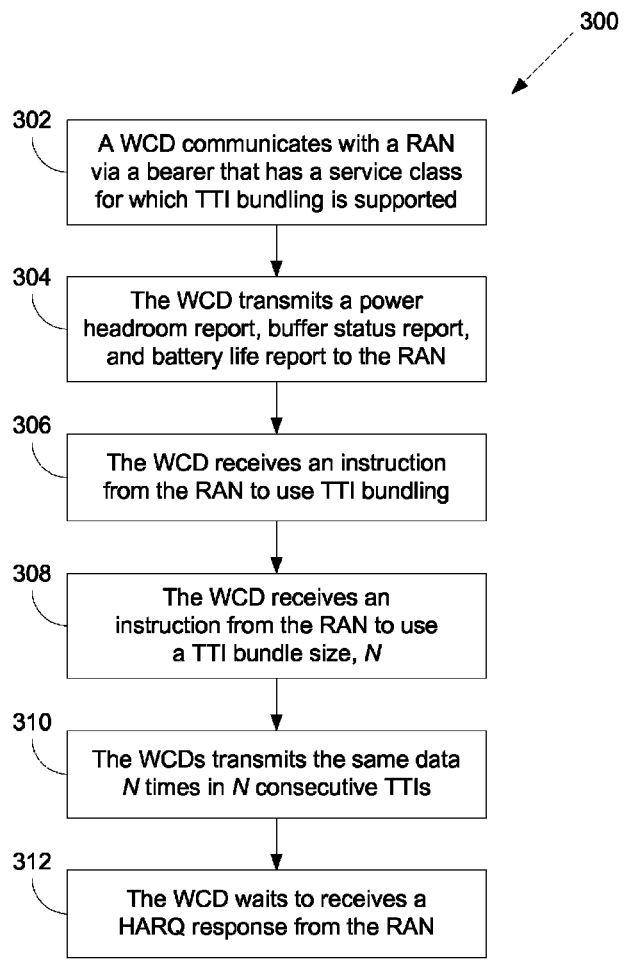
FIG. 4 is a flow chart of a method for a WCD, in accordance with an example embodiment.

FIG. 4 is a flowchart illustrating an example method 300 for a WCD that is instructed by a RAN to use TTI bundling. In method 300, the WCD communicates with the RAN via a bearer that has a service class for which TTI bundling is supported, as indicated by block 302. The bearer could be, for example, a bearer that has been established for voice-over-IP (VoIP) communications. In addition to this VoIP bearer, the WCD could have one or more other bearers established with the RAN. The other bearers could have service classes for which TTI bundling is not supported.

The WCD transmits a power headroom report, a buffer status report, and a battery life report to the RAN, as indicated by block 304. The WCD could transmit these reports as three separate reports or as one or more combined reports. For example, the WCD could transmit the battery life report as part of the power headroom report or as part of its buffer status report.

In this example, the information contained in the WCD's power headroom report, buffer status report, and battery life report indicate that TTI bundling is warranted for the WCD. For example, the WCD's power headroom could be negative, the WCD's buffer status report could indicate that it has data to transmit via a VoIP bearer (or other type of bearer for which TTI bundling is supported), and the WCD's battery life report could indicate that the WCD has sufficient battery life to engage in TTI bundling. Thus, the WCD receives an instruction from the RAN to use TTI bundling, as indicated by block 306.

The WCD also receives an instruction from the RAN to use a TTI bundle size, N, as indicated by block 308. The instructions of blocks 306 and 308 could be provided together. Thus, the RAN's instruction to use TTI bundling could also include an instruction to use a particular TTI bundle size. Alternatively, the instructions of blocks 306 and 308 could be provided separately. For example, the RAN could instruct the WCD to use TTI bundling but without specifying a TTI bundle size. In response, the WCD could apply a default TTI bundle size, such as N=4. Subsequently, the RAN may instruct the WCD to use a specific TTI bundle size that is different size than the default value, such as N=2 or N=3. Other examples are possible as well.

In response to receiving the instruction to use TTI bundling (block 306) and the instruction to use a TTI bundle size of N (block 308), the WCD transmits the same data N times in N consecutive TTIs, as indicated by block 310. After transmitting the data in the N consecutive TTIs, the WCD waits to receive a HARQ response from the RAN, as indicated by block 312. If the HARQ response is an ACK, the WCD may transmit additional data (either with or without TTI bundling). If the HARQ response is a NACK, the WCD may re-transmit the data N times in another N consecutive TTIs.

FIG. 5 is a flow chart illustrating an example method 400 for a RAN, in which the RAN selects a TTI bundle size, N, based on a utilization of a uplink shared channel (PUSCH) channel. In method 400, the RAN receives a power headroom report from a WCD, as indicated by block 402. The RAN determines that TTI bundling is warranted for the WCD based on at least the power headroom report, as indicated by block 404. The RAN could make this determination based on additional information as well, such as based on a buffer status report and/or battery life report from the WCD.

To determine what TTI bundle size the WCD should use, the RAN may determine a utilization, U, of the PUSCH channel, as indicated by block 406. The utilization, U, could be any quantity that characterizes the extent to which PUSCH channel resources are currently being used, the extent to which PUSCH channel resources have been allocated, and/or the extent to which PUSCH channel resources are likely to be used or allocated in the future. In one example, U may indicate what percentage of the uplink resource blocks associated with a given time period have been allocated to WCDs. The given time period could be, for example, the current TTI, the current TTI plus one or more TTIs immediately following the current TTI, or some other period of time for which uplink resources have been or could be allocated to WCDs. For example, suppose that the given time period for calculating U is the current TTI and that the RAN is able to allocate up to 50 resource blocks in a TTI. If the RAN has allocated only 40 of the 50 resource blocks in the current TTI, then the RAN could calculate U as 80%.

The RAN then selects a TTI bundle size, N, for the WCD based on the utilization, U, of the PUSCH channel, as indicated by block 408. In this example, the RAN selects the TTI bundle size, N, from a set of predefined values (N=2, N=3, and N=4), depending on whether the utilization is in a high range, low range, or medium range. To determine what range the utilization falls in, the RAN could compare U to one or more predefined utilization thresholds. In this example, the predefined utilization thresholds include a low utilization threshold, $U_1$, and a high utilization threshold, $U_2$. In an example in which U is a percentage, as described above, then $U_1$ could be a lower percentage, such as 30%, and $U_2$ could be a higher percentage, such as 80%. It is to be understood, however, that these percentages are only illustrative examples. The predefined thresholds, $U_1$ and $U_2$, could take on other values. In addition, the high, low, and medium ranges could be defined in other ways.

In the example of method 400, if U is less than $U_1$, then the RAN may conclude that the utilization is in the low range and select a TTI bundle size of N=4, as indicated by block 410. If U is greater than $U_2$, then the RAN may conclude that the utilization is in the high range and select a TTI bundle size of N=2, as indicated by block 412. If U is greater than $U_1$ but less than $U_2$, then the RAN may conclude that the utilization is in the medium range and select a TTI bundle size of N=3, as indicated by block 414. Once the RAN has selected a TTI bundle size, N, the RAN instructs the WCD to use the selected TTI bundle size, as indicated by block 416.

In some examples, the RAN may "ration" TTI bundling if the utilization of the uplink shared channel is sufficiently high. Such rationing may be triggered by the RAN determining that the amount of available uplink resources is insufficient to allow TTI bundling for all of the WCDs for which TTI bundling is warranted, even if the WCDs use the smallest TTI bundle size (e.g., N=2). In such instances, the RAN may determine how many WCDs using the smallest TTI bundle size can be accommodated by the available uplink resources and then select which WCDs will be allowed to use TTI bundling based on a prioritization of the WCDs for which TTI bundling is warranted. The prioritization could be based, for example, on the type of data each WCD is transmitting (e.g., data associated with services that are highly delay sensitive could be given priority over data associated with services that are less delay sensitive), each WCD's apparent need for TTI bundling (e.g., based on power headroom reports, re-transmission rates, and/or other factors), and/or each WCD's type of subscription. For example, suppose that the RAN determines that TTI bundling is warranted for m WCDs, but TTI bundling can be accommodated for only n WCDs, where n is less than m. In that case, the RAN could select m WCDs from among the n WCDs, based on a prioritization, and instruct only the n WCDs to use TTI bundling (e.g., with a TTI bundle size of 2).

FIG. 6 is a flow chart illustrating an example method 500 for a RAN, in which the RAN selects a TTI bundle size, N, based on a WCD's re-transmission rate. In method 500, the RAN receives a power headroom report from the WCD, as indicated by block 502. The RAN determines that TTI bundling is warranted for the WCD based on at least the power headroom report, as indicated by block 504. The RAN could make this determination based on additional information as well, such as based on a buffer status report and/or battery life report from the WCD.

To determine what TTI bundle size the WCD should use, the RAN may determine a re-re-transmission rate, R, for the WCD, as indicated by block 506. The re-transmission rate, R, could be any quantity that characterizes an extent to which transmissions by the WCD during a given time period have been re-transmissions or have resulted in re-transmission. The given time period could be, for example, a predetermined number of TTIs immediately preceding the current TTI. For example, suppose that during the given time period the WCD made an initial transmission of data in one TTI and then re-transmitted the data 3 times in 3 subsequent TTIs as a result of the HARQ process. In that case, the RAN may calculate R as 75%, based on 3 out of 4 of the WCD's transmissions in the given time period being re-transmissions. It is to be understood, however, that this method of calculating the re-transmission rate, R, is only an illustrative example, as the RAN could calculate R in other ways.

The RAN then selects a TTI bundle size, N, for the WCD based on the WCD's re-transmission rate, R, as indicated by block 508. In this example, the RAN selects the TTI bundle size, N, from a set of predefined values (N=2, N=3, and N=4), depending on whether the re-transmission rate is in a high range, low range, or medium range. To determine what range the re-transmission falls in, the RAN could compare R to one or more predefined re-transmission rate thresholds. In this example, the predefined re-transmission rate thresholds include a low rate threshold, $R_1$, and a high rate threshold, $R_2$. In an example in which R is a percentage, as described above, then $R_1$ could be a lower percentage, such as 30%, and $R_2$ could be a higher percentage, such as 70%. It is to be understood, however, that these percentages are only illustrative examples. The predefined thresholds, $R_1$ and $R_2$, could take on other values. In addition, the high, low, and medium ranges could be defined in other ways.

In the example of method 500, if R is less than $R_1$, then the RAN may conclude that the re-transmission rate is in the low range and select a TTI bundle size of N=2, as indicated by block 510. If R is greater than $R_2$, then the RAN may conclude that the re-transmission rate is in the high range and select a TTI bundle size of N=4, as indicated by block 512. If R is greater than $R_1$ but less than $R_2$, then the RAN may conclude that the re-transmission rate is in the medium range and select a TTI bundle size of N=3, as indicated by block 514. Once the RAN has selected a TTI bundle size, N, the RAN instructs the WCD to use the selected TTI bundle size, as indicated by block 516.

FIG. 7 is a flow chart illustrating an example method 600 for a RAN, in which the RAN selects a TTI bundle size, N, based on a WCD's remaining battery life. In method 600, the RAN receives a power headroom report and a battery life report from the WCD, as indicated by block 602. The battery life report could indicate a remaining battery life of the WCD, for example, as a percentage. Alternatively, the battery life report could include information that enables the WCD's remaining battery life to be determined.

The RAN determines that TTI bundling is warranted for the WCD based on at least the power headroom report, as indicated by block 604. The RAN could make this determination based on additional information as well, such as based on a buffer status report and/or the battery life report from the WCD.

To determine what TTI bundle size the WCD should use, the RAN may determine a remaining battery life, B, of the WCD based on the battery life report, as indicated by block 606. The remaining battery life, B, could be expressed as a percentage or in some other manner. For example, suppose the WCD has a total battery capacity of 1,000 milliamp-hours (mAh). If the WCD estimates that its battery capacity is down to 500 mAh, the WCD could report a remaining battery life of 50% in its battery life report. The RAN may then calculate B as the 50% remaining battery life indicated in the battery life report. Alternatively, the WCD's battery life report could report the battery capacity of 500 mAh or could report a remaining use time based on an expected rate of battery usage. From this information, the RAN may still be able to calculate B as 50%, for example, by looking up the WCD's battery characteristics.

The RAN selects a TTI bundle size, N, for the WCD based on the WCD's remaining battery life, B, as indicated by block 608. In this example, the RAN selects the TTI bundle size, N, from a set of predefined values (N=2, N=3, and N=4), depending on whether the remaining battery life is in a high range, low range, or medium range. To determine what range the remaining battery falls in, the RAN could compare B to one or more predefined battery life thresholds. In this example, the predefined battery life thresholds include a low battery threshold, $B_1$, and a high battery threshold, $B_2$. In an example in which B is a percentage, as described above, then $B_1$ could be a lower percentage, such as 40%, and $B_2$ could be a higher percentage, such as 50%. It is to be understood, however, that these percentages are only illustrative examples. The predefined thresholds, $B_1$ and $B_2$, could take on other values. In addition, the high, low, and medium ranges could be defined in other ways.

In the example of method 600, if B is less than $B_1$, then the RAN may conclude that the re-transmission rate is in the low range and select a TTI bundle size of N=2, as indicated by block 610. If B is greater than $B_2$, then the RAN may conclude that the re-transmission rate is in the high range and select a TTI bundle size of N=4, as indicated by block 612. If B is greater than $B_1$ but less than $B_2$, then the RAN may conclude that the re-transmission rate is in the medium range and select a TTI bundle size of N=3, as indicated by block 614. Once the RAN has selected a TTI bundle size, N, the RAN instructs the WCD to use the selected TTI bundle size, as indicated by block 616.

In some examples, the RAN may also define a minimum battery threshold, $B_{min}$, which the RAN could use to determine whether TTI bundling is warranted. Thus, B could be calculated and compared to $B_{min}$, in block 604 as part of the RAN's determination of whether TTI bundling is warranted for the WCD. For example, if the RAN determines that B is less than $B_{min}$, then the RAN may determine that TTI bundling is not warranted for the WCD, even if the WCD's power headroom report and buffer status report otherwise indicate that TTI bundling is warranted. $B_{min}$ could be, for example, 20% or some other value less than $B_1$.

4. Example Base Station

Figure 8:
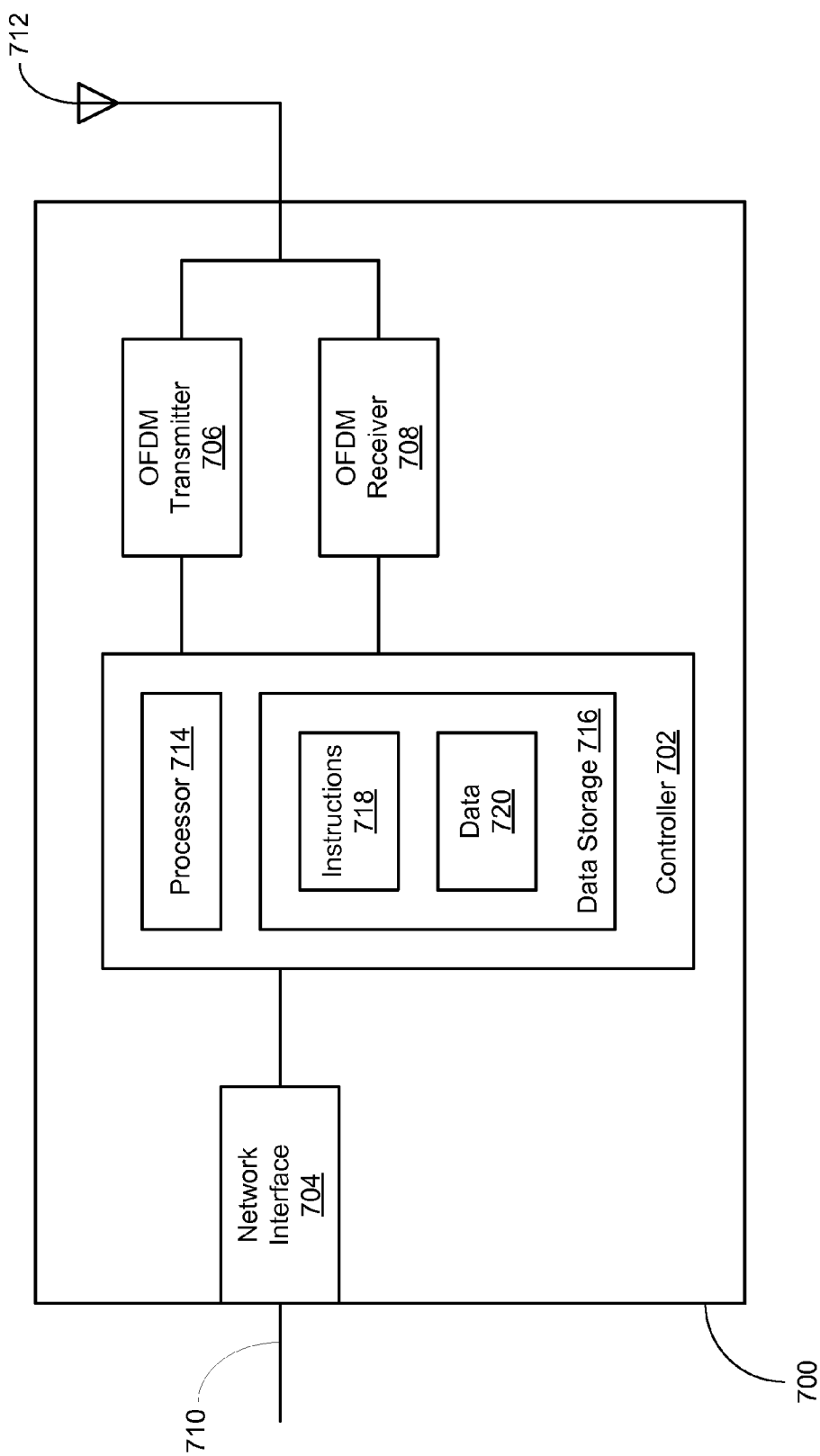
FIG. 8 is a block diagram of a base station, in accordance with an example embodiment.

FIG. 8 illustrates an example base station 700 that can perform at some of the RAN functions that are described herein, such as functions relating to method 200 shown in FIG. 3, method 400 shown in FIG. 5, method 500 shown in FIG. 6, and/or method 600 shown in FIG. 7. For example, base station 400 could correspond to base station 14 in RAN 12 and could perform RAN functions under the control of a controller 702 in base station 700 and/or under the control of one or more other entities, such as a radio network controller.

As shown in FIG. 8, controller 702 is coupled to a network interface 704, an OFDM transmitter 706, and an OFDM receiver 708. Network interface 704 is configured to communicate with one or more entities in the RAN via a backhaul connection 710. OFDM transmitter 706 and OFDM receiver 708 are configured to wirelessly communicate with WCDs that are operating in the wireless coverage area of base station 700, via one or more antennas, as exemplified in FIG. 8 by antenna 712. More particularly, OFDM transmitter 706 is configured to transmit OFDM signals in a plurality of downlink channels, which may include a downlink shared channel (e.g., a PDSCH channel) and a downlink control channel (e.g., a PDCCH channel). OFDM receiver 708 is configured to receive OFDM signals in a plurality of uplink channels, including an uplink shared channel (e.g., a PUSCH channel).

Controller 702 could be configured to control the functioning of base station 700. Thus, in relating to TTI bundling, the controller could be configured to: (a) determine whether TTI bundling is warranted for a WCD operating in the wireless coverage area of base station 700, based on at least a power headroom report transmitted by the WCD and received via OFDM receiver 708; (b) in response to a determination that TTI bundling is warranted for the WCD, select a TTI bundle size, N, for the WCD, for example, from among N=2, N=3, and N=4; and (c) cause OFDM transmitter 706 to transmit an instruction to WCD in the downlink control channel, wherein the instruction instructs the WCD to use the selected TTI bundle size when transmitting data in the uplink shared channel. The controller may be configured to select the TTI bundle size for the WCD based on at least one of a utilization of the uplink shared channel, a re-transmission rate of the WCD, or a remaining battery life of the WCD.

Controller 702 could be implemented using hardware, software, and/or firmware. In an example embodiment, controller 702 includes a processor 714 and data storage 716. Data storage 716 may include any type of non-transitory computer readable medium, such as random access memory (RAM), read-only memory (ROM), flash memory, cache memory, one or more magnetically encoded disks, one or more optically encoded disks, and/or any other type of volatile or non-volatile memory. Data storage 716 may store instructions 718 and data 720. Instructions 718 could be executable instructions that, when executed by processor 714, cause base station 700 to perform functions, such as any of the RAN functions described herein. Data 720 may include, for example, data from power headroom reports, data from buffer status reports, data from battery life reports, and/or any other type of data that may be generated or used by controller 702.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
 a radio access network (RAN) receiving a power headroom report from a wireless communication device (WCD);
 the RAN determining that transmission time interval (TTI) bundling is warranted for the WCD based on at least the power headroom report;
 in response to determining that TTI bundling is warranted for the WCD, the RAN selecting a TTI bundle size, N, for the WCD from among at least three values based on at least a utilization of an uplink shared channel, the at least three values including N=2, N=3, and N=4, wherein the RAN selecting the TTI bundle size, N, for the WCD based on at least a utilization of an uplink shared channel comprises:
 if the utilization of the uplink shared channel is in a low range, selecting the TTI bundle size of N=4;
 if the utilization of the uplink shared channel is in a medium range, selecting the TTI bundle size of N=3; and
 if the utilization of the uplink shared channel is in a high range, selecting the TTI bundle size of N=2; and
 the RAN instructing the WCD to use the selected TTI bundle size.

2. The method of claim 1, wherein TTI bundling is supported for only one or more service classes, and wherein the RAN determining that TTI bundling is warranted for the WCD is further based on the RAN determining that the WCD is buffering for transmission data associated with a service class for which TTI bundling is supported.

3. The method of claim 1, further comprising the RAN determining the utilization of the uplink shared channel based on an extent to which uplink resource blocks associated with a given time period have been allocated.

4. A method, comprising:
 a radio access network (RAN) receiving a power headroom report from a wireless communication device (WCD);
 the RAN determining that transmission time interval (TTI) bundling is warranted for the WCD based on at least the power headroom report;
 in response to determining that TTI bundling is warranted for the WCD, the RAN selecting a TTI bundle size, N, for the WCD from among at least three values based on at least a re-transmission rate of the WCD, the at least three values including N=2, N=3, and N=4, wherein the RAN selecting the TTI bundle size, N, for the WCD based on at least a re-transmission rate of the WCD comprises:
 if the re-transmission rate of the WCD is in a high range, selecting the TTI bundle size of N=4;
 if the re-transmission rate of the WCD is in a medium range, selecting the TTI bundle size of N=3; and if the re-transmission rate of the WCD is in a low range, selecting the TTI bundle size of N=2; and the RAN instructing the WCD to use the selected TTI bundle size.

5. The method of claim 4, further comprising the RAN determining the re-transmission rate of the WCD based on an extent to which transmissions by the WCD during a given time period have been re-transmissions.

6. The method of claim 4, wherein TTI bundling is supported for only one or more service classes, and wherein the RAN determining that TTI bundling is warranted for the WCD is further based on the RAN determining that the WCD is buffering for transmission data associated with a service class for which TTI bundling is supported.

7. A method, comprising:

a radio access network (RAN) receiving a power headroom report from a wireless communication device (WCD);

the RAN receiving an indication of a remaining battery life of the WCD;

the RAN determining that transmission time interval (TTI) bundling is warranted for the WCD based on at least the power headroom report;

in response to determining that TTI bundling is warranted for the WCD, the RAN selecting a TTI bundle size, N, for the WCD from among at least three values based on at least the remaining battery life of the WCD, the at least three values including N=2, N=3, and N=4, wherein the RAN selecting the TTI bundle size, N, for the WCD based on at least the remaining battery life of the WCD comprises:

if the remaining battery life of the WCD is in a high range, selecting the TTI bundle size of N=4;

if the remaining battery life of the WCD is in a medium range, selecting the TTI bundle size of N=3; and if the remaining battery life of the WCD is in a low range, selecting the TTI bundle size of N=2; and the RAN instructing the WCD to use the selected TTI bundle size.

8. The method of claim 7, wherein the RAN receiving an indication of a remaining battery life of the WCD comprises the RAN receiving a battery life report from the WCD.

9. The method of claim 7, wherein TTI bundling is supported for only one or more service classes, and wherein the RAN determining that TTI bundling is warranted for the WCD is further based on the RAN determining that the WCD is buffering for transmission data associated with a service class for which TTI bundling is supported.

* * * * *